No. 853,154. PATENTED MAY 7, 1907.
G. S. BLUEBAUM.
POWER TRANSMISSION.
APPLICATION FILED JAN. 10, 1907.
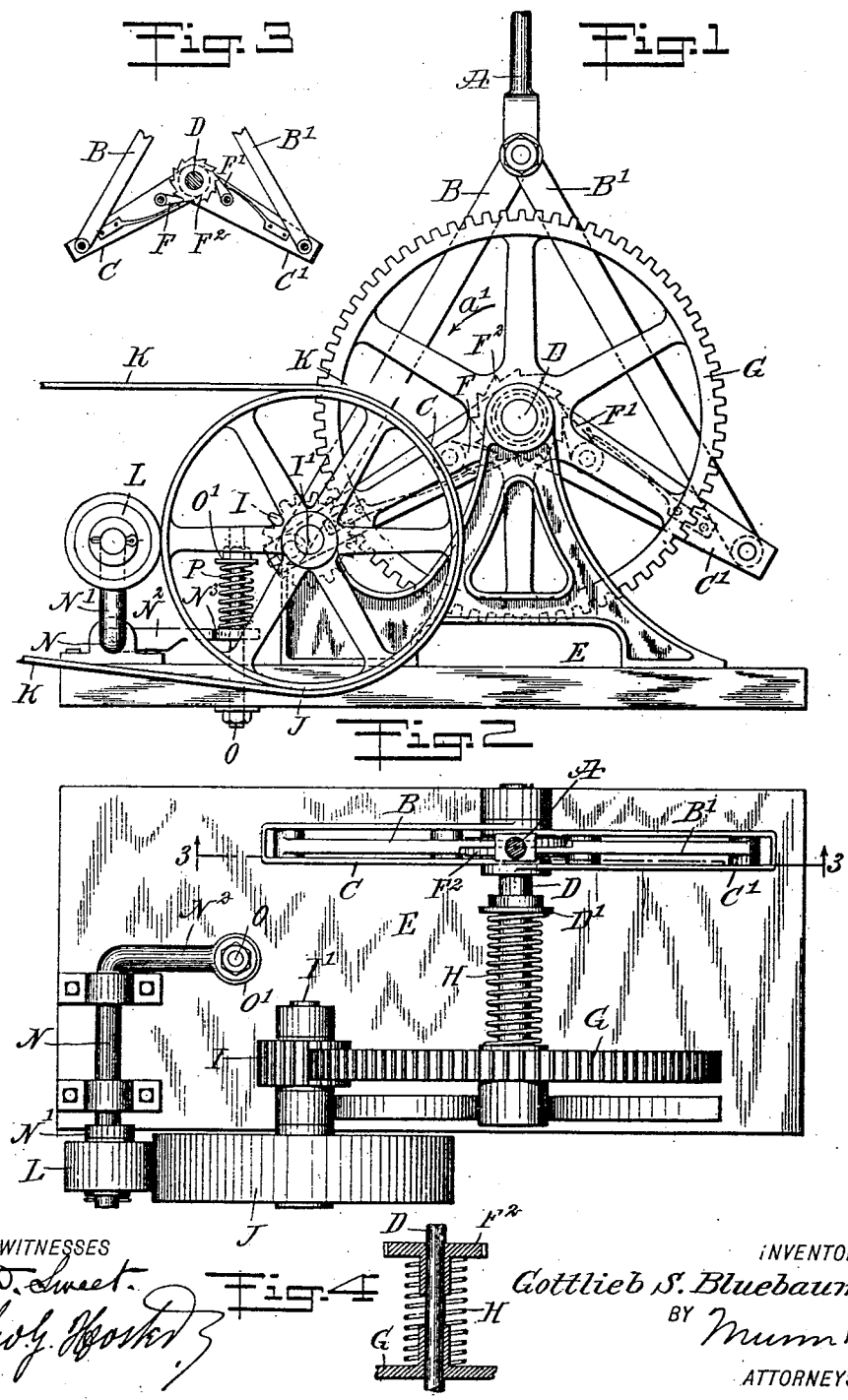
WITNESSES
INVENTOR
Gottlieb S. Bluebaum
BY Munn & Co
ATTORNEYS

UNITED STATES PATENT OFFICE.

GOTTLIEB S. BLUEBAUM, OF BILLINGS, MISSOURI.

POWER TRANSMISSION.

No. 853,154.　　　Specification of Letters Patent.　　　Patented May 7, 1907.

Application filed January 10, 1907. Serial No. 351,647.

*To all whom it may concern:*

Be it known that I, GOTTLIEB S. BLUEBAUM, a citizen of the United States, and a resident of Billings, in the county of Christian and State of Missouri, have invented a new and Improved Power Transmission, of which the following is a full, clear, and exact description.

The invention relates to devices for converting reciprocating motion into rotary motion, and its object is to provide a new and improved power transmission more especially designed for transmitting the power of wind mills and like motors to other machinery, and arranged to steady the motion when the motor runs light or heavy.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1 is a side elevation of the improvement; Fig. 2 is a plan view of the same; Fig. 3 is a reduced sectional side elevation of part of the improvement on the line 3—3 of Fig. 2; and Fig. 4 is a sectional plan view of a modified form of the improvement.

The pump rod A or like reciprocating member of a wind mill or similar motor, is pivotally connected by links B, B' with arms C, C' fulcrumed loosely on a shaft D journaled in suitable bearings on a frame E. On the arms C, C' are pivoted the spring-pressed pawls F and F', in engagement with opposite sides of a ratchet wheel $F^2$ secured on the shaft D, so that when the pump rod A or a similar reciprocating member is in motion, then the links B, B' impart a simultaneous up and down swinging motion to the arms C, C', which by the pawls F and F' impart a continuous rotary motion to the ratchet wheel $F^2$ and consequently to the shaft D. It is understood that when the arms C, C' swing upward, the pawl F glides over the ratchet wheel $F^2$, while the pawl F' turns the ratchet wheel in the direction of the arrow $a'$, and when the arms C, C' swing downward then the pawl F' glides over the ratchet wheel $F^2$, while the pawl F turns the ratchet wheel $F^2$ and consequently the shaft D in the direction of the arrow $a'$.

On the shaft D is mounted to turn loosely a gear wheel G, connected with one end of a spring H, coiled on the shaft D and secured at its other end to a collar D' attached to the shaft D. Now when the latter is rotated as above described, then the spring H is placed under tension and finally carries along the gear wheel G. The latter is in mesh with a pinion I having its shaft I' journaled in suitable bearings on the frame E, and on the said shaft I' is secured a pulley J connected by a belt K with other machinery to be driven.

The peripheral face of the pulley J is engaged by a brake roller L, journaled on a crank arm N' of a shaft N, mounted in suitable bearings arranged on the frame E, and the said shaft N is provided with a second crank arm $N^2$ standing at angles to the crank arm N and provided at its free end with an eye $N^3$ through which extends a bolt O held on the frame E. A spring P is mounted on the bolt O and presses with one end on the eye $N^3$ of the crank arm $N^2$, so as to hold the brake roller L in firm contact with the pulley J, to steady the rotary motion of the latter in case the wind mill or other motor runs light or heavy.

As shown in the drawings, the spring P engages with its upper end a washer O' held on the upper end of the bolt O, so that the spring P exerts a desired pressure on the crank arm $N^2$, to force the brake roller L in firm contact with the pulley J.

The power transmission shown and described is very simple and durable in construction, and by the use of the loose gear wheel G and its connection with the shaft D by the spring H, the transmitted power is readily equalized according to the load and according to the power with which the motor is running. The same result may be obtained by the construction shown in Fig. 4, in which the ratchet wheel $F^2$ is loose on the shaft D and is connected by the spring H with the gear wheel G also loose on the shaft D.

Having thus described my invention, I claim as new and desire to secure by Letters Patent:

1. A power transmission comprising a shaft, a ratchet wheel secured on the said shaft, pawls engaging opposite sides of the said ratchet wheel, arms fulcrumed loosely on the said shaft and carrying the said pawls, a reciprocating member, links connecting the said reciprocating member with the said arms, a gear wheel held loose on the said shaft, a torsion spring coiled on the said shaft and having one end attached to the shaft and the other to the said gear wheel, a pinion in mesh with the said gear wheel, a transmission pulley rotating with the said pinion, and a spring-controlled brake mechanism for the said pulley.

2. A power transmission having a power transmitting pulley, and a brake mechanism for the same comprising a brake roller in peripheral engagement with the said pulley, a crank shaft having two crank arms at angles one to the other, one of the crank arms carrying the said brake roller, and a spring pressing the other crank arm.

3. A power transmission having a power transmitting pulley, and a brake mechanism for the same comprising a brake roller in peripheral engagement with the said pulley, a crank shaft having two crank arms at angles one to the other, one of the crank arms carrying the said brake roller, a fixed bolt extending through an eye in the other crank arm, and a coil spring on the said bolt and pressing the said crank arm eye.

4. A power transmission, comprising a shaft, a reciprocating member, a connection between said member, and the shaft whereby to rotate said shaft, a gear wheel loosely mounted on the shaft, a tension spring coiled on said shaft and having one end attached thereto, and the other end to the gear wheel, a pinion in mesh with the said gear wheel, a transmission pulley rotating with the said pinion, and a spring controlled brake mechanism for the said pulley.

In testimony whereof I have signed my name to this specification in the presence of two subscribing witnesses.

GOTTLIEB S. BLUEBAUM.

Witnesses:
   JOHN GIESSNUR,
   WM. M. PURGGS.